United States Patent
Zhang et al.

(10) Patent No.: US 11,126,162 B1
(45) Date of Patent: *Sep. 21, 2021

(54) 3D PRINTING SLICING METHOD, APPARATUS, DEVICE, AND STORAGE MEDIUM

(71) Applicant: Shanghai Fusion Tech Co., Ltd., Shanghai (CN)

(72) Inventors: Jinjing Zhang, Shanghai (CN); Jianzhe Li, Shanghai (CN); Hua Feng, Shanghai (CN)

(73) Assignee: Shanghai Fusion Tech Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/116,432

(22) Filed: Dec. 9, 2020

Related U.S. Application Data

(63) Continuation of application No. 17/098,423, filed on Nov. 15, 2020.

(30) Foreign Application Priority Data

Sep. 17, 2020 (CN) .......................... 202010977833.9

(51) Int. Cl.
*G05B 19/4099* (2006.01)
*G06T 15/04* (2011.01)
(Continued)

(52) U.S. Cl.
CPC ............ *G05B 19/4099* (2013.01); *G06T 7/40* (2013.01); *G06T 7/529* (2017.01); *G06T 15/04* (2013.01); *G05B 2219/49023* (2013.01)

(58) Field of Classification Search
CPC ....... B33Y 30/00; B29C 64/386; G06T 19/20; G06T 2219/2021; G06T 11/001; G06T 15/04; G06T 17/00; G06F 30/00
See application file for complete search history.

(56) References Cited

U.S. PATENT DOCUMENTS

2016/0019319 A1* 1/2016 Shtilerman ........ G05B 19/4099
264/308
2017/0368755 A1* 12/2017 Bader ................ G05B 19/4099
(Continued)

FOREIGN PATENT DOCUMENTS

CN 108145975 A 6/2018
CN 109834942 A 6/2019
(Continued)

OTHER PUBLICATIONS

Research on color section contour generation algorithm of texture mapping model, Vacuum, vol. 57, No. 2, Mar. 2020.
(Continued)

*Primary Examiner* — Xiao M Wu
*Assistant Examiner* — Scott E Sonners
(74) *Attorney, Agent, or Firm* — Avant Law Group, LLC

(57) ABSTRACT

3D printing slicing methods, apparatuses, devices, and storage mediums are disclosed. In an embodiment, a 3D printing slicing method includes the following steps: (1) acquiring a 3D model and a target texture picture; (2) obtaining a first model and obtaining a first picture; (3) establishing a mapping set between the first model and the first picture; (4) slicing a target layer of the first model by a slice plane to obtain at least one intersection point; (5) looking up at least one mapping point corresponding to the at least one intersection point in the first picture according to the mapping set, and obtaining corresponding outer contour points by revising coordinates of the at least one intersection point; and (6) obtaining an outer contour boundary line of the target layer by connecting the outer contour points successively.

14 Claims, 5 Drawing Sheets

(51) Int. Cl.
    *G06T 7/529* (2017.01)
    *G06T 7/40* (2017.01)

(56) References Cited

U.S. PATENT DOCUMENTS

2018/0268616 A1* 9/2018 Choi ........................ G06T 15/04
2019/0023060 A1* 1/2019 Maertens .................. B44F 9/02
2019/0057519 A1   2/2019 Cinnamon et al.

FOREIGN PATENT DOCUMENTS

CN    110355365 A    10/2019
CN    110757804 A     2/2020

OTHER PUBLICATIONS

First Office Action of Chinese Application No. 202010977833.9 by CNIPA dated Mar. 12, 2021.

\* cited by examiner

//3D PRINTING SLICING METHOD, APPARATUS, DEVICE, AND STORAGE MEDIUM

CROSS REFERENCE TO RELATED APPLICATIONS

This application is a continuation of U.S. application Ser. No. 17/098,423, filed on Nov. 15, 2020, which claims priority to Chinese application number 202010977833.9, filed on Sep. 17, 2020, the disclosures of which are incorporated by reference herein in their entireties.

FIELD OF THE DISCLOSURE

The disclosure relates generally to 3D printing. More specifically, the disclosure relates 3D printing slicing methods, apparatuses, devices, and storage mediums.

BACKGROUND

Slicing refers to dividing an entity into many layers having an equal thickness, which is a basis of 3D printing. The divided layers will become paths to perform 3D printing. Due to layering of the entity, the surface of the 3D printed article usually has an obvious lamination effect. Particularly, in a case where an inclined plane is printed and the layer thickness is large, the lamination effect will become more obvious.

Currently, there are two methods to solve the lamination effect. One is to reduce the layer thickness because the layer thickness approximately decides the accuracy, especially the surface accuracy, of 3D printing. The smaller the layer thickness, the higher the relative accuracy of the printed articles and the better the surface texture. The other method is to establish specific surface texture features and to apply the surface texture features to a 3D printing model.

However, the latter method requires more professional modeling and 3D knowledge to establish surface texture features and the scope of application is limited. As a result, it is difficult for non-professionals to perform. And there is no effective solution regarding these limitations yet.

SUMMARY

The following presents a simplified summary of the invention to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, disclosure provides a 3D printing slicing method including the following steps.

(1) Acquiring a 3D model and a target texture picture. The target texture picture is an outer contour texture picture of an object obtained by printing the 3D model.

(2) Obtaining a first model by preprocessing the 3D model and obtaining a first picture by preprocessing the target texture picture.

(3) Establishing a mapping set between the first model and the first picture, so that every coordinate point in the first model has a corresponding mapping point in the first picture.

(4) Slicing a target layer of the first model by a slice plane to obtain at least one intersection point between the target layer and the slice plane.

(5) Looking up at least one mapping point corresponding to the at least one intersection point in the first picture according to the mapping set, and obtaining corresponding outer contour points by revising coordinates of the at least one intersection point according to a difference between a pixel value of the at least one mapping point and a preset pixel threshold value.

(6) Obtaining an outer contour boundary line of the target layer by connecting the outer contour points successively.

Optionally, obtaining the first model in step (2) includes dividing each outside surface of the 3D model into a plurality of triangular planes by a triangulation algorithm, respectively.

Optionally, the mapping set includes a first mapping set and a second mapping set, every coordinate point in the first model includes a vertex coordinate point of a triangular plane in the plurality of triangular planes and a non-vertex coordinate point of the triangular plane, the first mapping set includes a mapping relationship between the vertex coordinate point and the corresponding mapping point of the vertex coordinate point in the first picture, and the second mapping set includes a mapping relationship between the non-vertex coordinate point and the corresponding mapping point of the non-vertex coordinate point in the first picture.

Optionally, looking up at least one mapping point in step (5) includes the following steps. Upon determining that there is a plurality of intersection points, looking up the at least one mapping point corresponding to the plurality of intersection points respectively in the first picture according to the second mapping set, and upon determining that there is one intersection point, looking up the at least one mapping point corresponding to the intersection point in the first picture according to the first mapping set.

Optionally, obtaining the first picture in step (2) includes converting RGB color values of each pixel point in the target texture picture into corresponding gray values.

Optionally, the target layer in step (4) is an intermediate layer of the first model. Obtaining corresponding outer contour points in step (5) includes the following steps. Upon determining that a gray value of the at least one mapping point is greater than the preset pixel threshold value, moving the at least one intersection point horizontally outward by a first distance. The first distance is calculated by subtracting the preset pixel threshold value from the gray value of the at least one mapping point. Upon determining that the gray value of the at least one mapping point is smaller than the preset pixel threshold value, moving the at least one intersection point horizontally inward by a second distance. The second distance is calculated by subtracting the gray value of the mapping point from the preset pixel threshold value.

Optionally, the target layer in step (4) is a top layer of the first model. Obtaining corresponding outer contour points in step (5) includes the following steps. Upon determining that a gray value of the at least one mapping point is greater than the preset pixel threshold value, moving the at least one intersection point vertically upward by a first distance. The first distance is calculated by subtracting the preset pixel threshold value from the gray value of the at least one mapping point. Upon determining that the gray value of the at least one mapping point mapping point is smaller than the preset pixel threshold value, moving the at least one intersection point vertically downward by a second distance. The second distance is calculated by subtracting the gray value of the mapping point from the preset pixel threshold value.

In other embodiments, the disclosure provides a 3D printing slicing apparatus including an acquiring module, a processing module, and an output module.

The acquiring module is configured to acquire a 3D model and a target texture picture. The target texture picture is an outer contour texture picture of an object obtained by printing the 3D model.

The processing module configured to perform the following steps. Obtaining a first model by preprocessing the 3D model and obtain a first picture by preprocessing the target texture picture. Establishing a mapping set between the first model and the first picture, so that every coordinate point in the first model has a corresponding mapping point in the first picture. Slicing a target layer of the first model by a slice plane to obtain at least one intersection point between the target layer and the slice plane. Looking up at least one mapping point corresponding to the at least one intersection point in the first picture according to the mapping set. Obtaining corresponding outer contour points by revising coordinates of the at least one intersection point according to a difference between a pixel value of the at least one mapping point and a preset pixel threshold value The output module is configured to obtain an outer contour boundary line of the target layer by connecting the outer contour points successively.

In further embodiments, the disclosure provides a 3D printing slicing device including one or more processor, a memory, and an application stored in the memory and configured to be executed by the one or more processor to implement a 3D printing slicing method.

In some embodiments, the disclosure provides a computer-readable storage medium configured to store a computer program where the computer program is loaded by a processor to execute a 3D printing slicing method.

In other embodiments, the disclosure provides a non-transitory computer-readable medium including one or more sequences of instructions that, when executed by one or more processors, cause the one or more processors to execute a 3D printing slicing method.

BRIEF DESCRIPTION OF THE DRAWINGS

Illustrative embodiments of the present disclosure are described in detail below with reference to the attached drawing figures.

DETAILED DESCRIPTION

Figure 1:
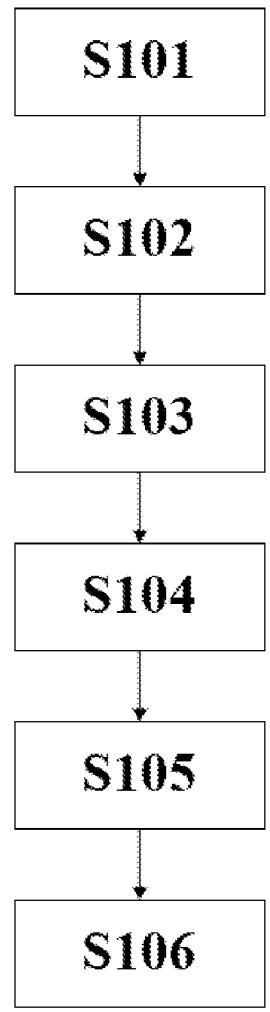
FIG. 1 is a flow chart illustrating a 3D printing slicing method according to an embodiment of the disclosure.

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

It should be noted that the terms "first", "second" and so forth in the description and claims as well as the drawings of the present application are used to distinguish similar objects, and are not necessary to describe a particular order or sequential order. It should be understood that the data used this way may be interchanged where appropriate in order to facilitate the embodiments of the present application described herein. In addition, terms "comprising", "having", and any variations thereof are intended to cover non-exclusive inclusions, for example, processes, methods, systems, products or devices that contain a series of steps or units are not necessary to be limited to those explicitly listed steps or units, but may include other steps or units not explicitly listed or inherent to these processes, methods, products or devices.

In the present application, the orientation or positional relationship indicated by the terms "up", "down", "left", "right", "front", "back", "top", "bottom", "inside", "outside", "middle", "vertical", "horizontal", "transverse", "longitudinal" and the like are orientation or positional relationship shown based on the drawings. These terms are mainly used to describe the present application and the embodiments thereof better and are not used to define that the indicated apparatus, element, or component must have a specific orientation, or are configured and operated in a specific orientation.

Moreover, some of the terms mentioned above may be used to indicate other meanings, in addition to indicating orientation or positional relationship. For example, the term "up" may also be used to indicate a certain attachment relationship or connection relationship in some cases. For ordinary skilled in the art, the specific meanings of these terms in the application may be understood according to specific cases. In addition, the meaning of the term "a plurality of" shall be two or more. It should be noted that the embodiments of the present application and the features in the embodiments may be combined with each other without conflict.

Some embodiments of the disclosure provides a 3D printing slicing method. The subject to execute the 3D printing slicing method may be a 3D printing slicing apparatus, and the 3D printing slicing apparatus may be applied to a processor. The 3D printing slicing method may include the following steps. (1) Acquiring a 3D model and a target texture picture. The target texture picture may be an outer contour texture picture of an object obtained by printing the 3D model. (2) Obtaining a first model by preprocessing the 3D model and obtaining a first picture by preprocessing the target texture picture. (3) Establishing a mapping set between the first model and the first picture, so that every coordinate point in the first model has a corresponding mapping point in the first picture. (4) Slicing a target layer of the first model by a slice plane to obtain at least one intersection point between the target layer and the slice plane. (5) Looking up at least one mapping point corresponding to the at least one intersection point in the first picture according to the mapping set, and obtaining corresponding outer contour points by revising coordinates of the at least one intersection point according to a difference between a pixel value of the at least one mapping point and a preset pixel threshold value. (6) Obtaining an outer contour boundary line of the target layer by connecting the outer contour points successively.

FIG. 1 is a flow chart illustrating a 3D printing slicing method according to an embodiment of the disclosure. The 3D printing slicing method may include the following steps.

S101: A 3D model and a target texture picture are acquired. The target texture picture may be an outer contour texture picture of an object obtained by printing the 3D model.

In some embodiments, the target is the outer contour path obtained after slicing of the 3D model which may be changed according to a gray value of the target texture picture. The 3D printing effect of the outer contour path may be consistent with the target texture picture. Therefore, the target texture picture may be an outer contour texture picture of the object obtained by printing the 3D model.

S102: A first model may be obtained by preprocessing the 3D model, and a first picture may be obtained by preprocessing the target texture picture.

In some embodiments, preprocessing the 3D model may be dividing every outside surface of the 3D model into a plurality of triangular planes by a triangulation algorithm, respectively. Since the 3D model consists of a plurality of outside surfaces and each outside surface may be a polygon, each polygon may be then divided and transformed into a plurality of triangular planes to obtain the first model. Next, preprocessing the target texture picture may be converting RGB color values of each pixel point in the target texture picture into corresponding gray values. In other words, the first picture may be a gray picture, and the pixel value of each pixel point in the gray picture may be taken between [0, 255]. Specifically, the RGB color values may be converted into gray values by the following equation.

$$\text{Gray Value}=0.2126 \times R+0.7152 \times G+0.722 \times B$$

While the above methods are implemented in some embodiments of the disclosure, it should be noted that a person of ordinary skill in the art would understand and implement other methods for dividing the outside surface into a plurality of triangular planes and other methods for converting RGB color values into gray values applicable to the disclosure.

S103: A mapping set between the first model and the first picture may be established, so that every coordinate point in the first model has a corresponding mapping point in the first picture.

In some embodiments, the mapping set may include a first mapping set and a second mapping set. Every coordinate point in the first model may include a vertex coordinate point of a triangular plane in the plurality of triangular planes and a non-vertex coordinate point of the triangular plane. The first mapping set may include a mapping relationship between the vertex coordinate point and the corresponding mapping point of the vertex coordinate point in the first picture. The second mapping set may include a mapping relationship between the non-vertex coordinate point and the corresponding mapping point of the non-vertex coordinate point in the first picture. Optionally, the method of establishing a mapping set may adopt any one of the existing mapping methods, such as UV texture mapping. UV texture mapping may make each point on the image accurately correspond to a surface of the 3D model object and perform image smooth interpolation processing at a gap position between points by software. As a result, for a vertex or a non-vertex coordinate point of any one of the triangular planes on the first model, a corresponding mapping point may be found in the first picture.

S104: A target layer of the first model may be sliced by a slice plane to obtain at least one intersection point between the target layer and the slice plane.

In some embodiments, the target layer may be any layer of the first model and the slice plane may be a horizontal plane. When the first model is sliced, the outer contour may be divided into a side surface and a top surface. The top surface corresponds to a top layer of the first model, and the side surface corresponds to an intermediate layer of the first model. After the outer contour located at the side surface is sliced, an outer contour path of each layer consists of line segments inside each triangular plane or consists of vertexes of each triangular plane. The outer contour located at the top surface, as a layer after slicing, may use sampling lines in a certain direction to determine each point sampled on the top surface. The outer contour of the top surface mainly consists of two kinds of structure: a triangle or a part of a triangle cut by a slice plane. For the cut triangle, it would be a polygon that left on a layer of the top surface, and the polygon may still be further converted into a triangle. It should be noted that a directional angel of the sampling line may be manually defined by a user or may be automatically generated by a software.

S105: A mapping point corresponding to at least one intersection point in the first picture may be looked up according to the mapping set, and coordinates of the intersection point corresponding to the mapping point are revised according to a difference between a pixel value of the at least one mapping point and a preset pixel threshold value to obtain corresponding outer contour points.

In some embodiments, if there is only one intersection point between the target layer and the slice plane, the slice plane and the target layer are intersected at one of the vertexes of the triangular plane. The intersection point may find a corresponding mapping point in the first picture according to the first mapping set. If there is more than one intersection point between the target layer and the slice plane, the slice plane and the target layer are intersected at a middle of the triangular plane, i.e., a plurality of intersection points may form one intersecting line segment. Each intersection point on the intersecting line segment may find a corresponding mapping point in the first picture according to the second mapping set, the pixel value of the mapping point may be compared with the preset pixel threshold value. According to the difference between them, the intersection point corresponding to the mapping point may be accordingly moved, thereby obtaining corresponding outer contour points.

S106: An outer contour boundary line of the target layer may be obtained by connecting the outer contour points successively.

In some embodiments, the outer contour point may be obtained by moving the intersection point corresponding to the mapping point according to the difference between the pixel value of the mapping point and the preset pixel threshold value. Thus, the outer contour line consists of a plurality of successively connected broken lines, and these broken lines constitute the outer contour boundary line of the target layer.

In other embodiments, the outer contour texture picture (i.e., target texture picture) of the object may be loaded into the surface of the 3D model as depth texture information. Coordinates of the intersection point may be revised by the mapping relationship between the first model and the first picture, and the difference between the pixel value of the mapping point and the preset pixel threshold value to obtain outer contour boundary lines. The user may edit surface textures of the module by loading the two-dimensional picture into the model surface without modifying the 3D model and establishing surface texture features, such that different effects of directly simulating various textures or materials by a software method may be implemented, therefore widening the scope of the application.

Figure 2:
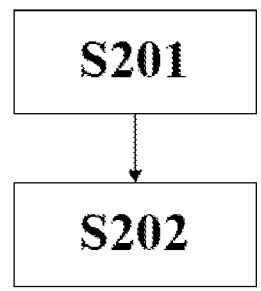
FIG. 2 is a flow chart illustrating looking up a mapping point according to an embodiment of the disclosure.

FIG. 2 is a flow chart illustrating looking up a mapping point according to an embodiment of the disclosure. A mapping point corresponding to at least one intersection point in the first picture may be looked up according to the mapping set, which may further include the following steps S201 and S202.

Figure 3:
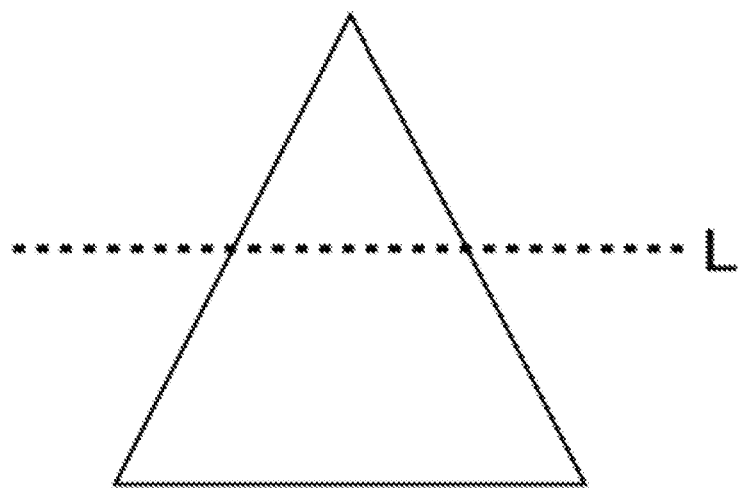
FIG. 3 is a schematic diagram illustrating an intersection embodiment of a plurality of intersection points according to an embodiment of the disclosure.

S201: If there is a plurality of intersection points, mapping points corresponding to the plurality of intersection points respectively in the first picture may be looked up according to the second mapping set. FIG. 3 is a schematic diagram illustrating an intersection embodiment of a plurality of intersection points according to an embodiment of the disclosure. Since the second mapping set may include a mapping relationship between the non-vertex coordinate point of any one of the triangular planes and the mapping point of the first picture, when there is a plurality of intersection points, the slice plane L and the target layer are intersected in a triangle of any one of the triangular planes and intersected at one intersecting line segment in the triangle. Here, the plurality of intersection points constitute the intersecting line segment. Therefore, the mapping points corresponding to the plurality of intersection points respectively in the first picture may be looked up by the second mapping set.

Figure 4:
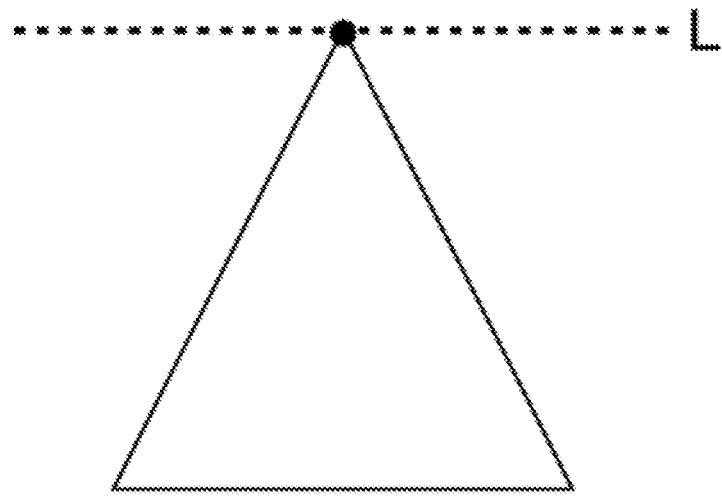
FIG. 4 is a schematic diagram illustrating an intersection embodiment of one intersection point according to an embodiment of the disclosure.

S202: If there is one intersection point, a mapping point corresponding to the intersection point in the first picture may be looked up according to the first mapping set. FIG. 4 is a schematic diagram illustrating an intersection embodiment of one intersection point according to an embodiment of the disclosure. Since the first mapping set may include a mapping relationship between the vertex of any one of the triangular planes and the mapping point in the first picture, when there is only one intersection point, the slice plane L and the target layer are intersected on a vertex of any one of the triangular planes. Therefore, the mapping point corresponding to the intersection point in the first picture may be looked up by the first mapping set.

Figure 5:
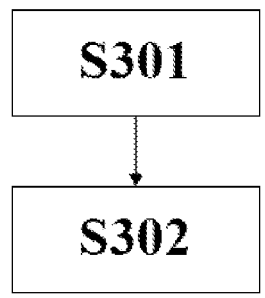
FIG. 5 is a flow chart illustrating obtaining an outer contour point according to an embodiment of the disclosure.

FIG. 5 is a flow chart illustrating obtaining an outer contour point according to an embodiment of the disclosure. In some embodiments, the target layer is an intermediate layer of the first model, and coordinates of the intersection point corresponding to the mapping point are revised according to the difference between the pixel value of the mapping point and the preset pixel threshold value, to obtain corresponding outer contour points, which may further include the following steps S301 and S302.

S301: If the gray value of the mapping point is greater than the preset pixel threshold value, the intersection point corresponding to the mapping point may be moved horizontally outward by a first distance to obtain corresponding outer contour points. The first distance may be calculated by subtracting the preset pixel threshold value from the gray value of the mapping point. Optionally, the intermediate layer and the slice plane are intersected on the side surface. Since the gray value of each pixel point on the first picture is between [0, 255], the gray value of each mapping point is between [0, 255]. The preset pixel threshold value may be set as 128, and if the gray value of the mapping point is 200, which is greater than 128, the intersection point corresponding to the mapping point may be moved horizontally outward by a first distance. The first distance may be calculated by subtracting the preset pixel threshold value from the gray value of the mapping point. That is, the intersection point is moved horizontally outward by 72 coordinate values to obtain an x-axis coordinate and a y-axis coordinate of the corresponding outer contour point.

S302: If the gray value of the mapping point is smaller than the preset pixel threshold value, the intersection point corresponding to the mapping point may be moved horizontally inward by a second distance to obtain corresponding outer contour points. The second distance may be calculated by subtracting the gray value of the mapping point from the preset pixel threshold value. Optionally, the gray value of each pixel point on the first picture is between [0, 255], and the gray value of each mapping point is between [0, 255]. The preset pixel threshold value may be set as 128, and if the gray value of the mapping point is 100, which is smaller than 128, the intersection point corresponding to the mapping point may be moved horizontally inward by a second distance. The second distance may be calculated by subtracting the gray value of the mapping point from the preset pixel threshold value. That is, the intersection point may be moved horizontally inward by 28 coordinate values to obtain an x-axis coordinate and a y-axis coordinate of the corresponding outer contour point.

Figure 6:
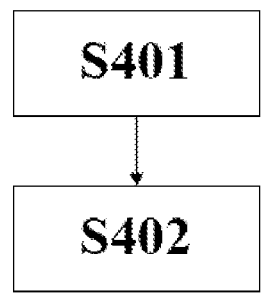
FIG. 6 is a flow chart illustrating obtaining an outer contour point according to another embodiment of the disclosure.

FIG. 6 is a flow chart illustrating obtaining an outer contour point according to another embodiment of the disclosure. In some embodiments, the target layer may be a top layer of the first model, and coordinates of the intersection point corresponding to the mapping point may be revised according to the difference between the pixel value of the mapping point and the preset pixel threshold value, to obtain corresponding outer contour points, which may further include the following steps S401 and S402.

S401: If the gray value of the mapping point is greater than the preset pixel threshold value, the intersection point corresponding to the mapping point may be moved vertically upward by a first distance to obtain corresponding outer contour points. The first distance may be calculated by subtracting the preset pixel threshold value from the gray value of the mapping point. Optionally, the top layer and the slice plane are intersected on the top surface, and each point sampled on the top surface, i.e., the intersection point between the sampling line and the triangular plane of the top surface, is determined by sampling lines in a certain direction. Likewise, there may be one or more intersection points. Here, the case is similar to steps S201 and S202, and the descriptions in steps S201 and S202 are incorporated by reference. Since the gray value of each pixel point on the first picture is between [0, 255], the gray value of each mapping point is between [0, 255]. The preset pixel threshold value may be set as 128, and if the gray value of the mapping point is 200, which is greater than 128, the intersection point corresponding to the mapping point may be moved vertically upward by a first distance. The first distance may be calculated by subtracting the preset pixel threshold value from the gray value of the mapping point. That is, the intersection point may be moved vertically upward by 72 coordinate values to obtain a z-axis coordinate of the corresponding outer contour point.

S402: If the gray value of the mapping point is smaller than the preset pixel threshold value, the intersection point corresponding to the mapping point may be moved vertically downward by a second distance to obtain corresponding outer contour points. The second distance may be calculated by subtracting the gray value of the mapping point from the preset pixel threshold value. Since the gray value of each pixel point on the first picture is between [0, 255], the gray value of each mapping point is between [0, 255]. The preset pixel threshold value may be set as 128, and if the gray value of the mapping point is 100, which is smaller than 128, the intersection point corresponding to the mapping point may be moved vertically downward by a second distance. The second distance may be calculated by subtracting the gray value of the mapping point from the preset pixel threshold value. That is, the intersection point may be moved vertically downward by 28 coordinate values, to obtain a z-axis coordinate of the corresponding outer contour point.

In some embodiments, the coordinate points on each sampling line of the top surface will no longer be at the same height. As a result, the print height and the extrusion amount of the 3D printer extrusion nozzle need to be accordingly adjusted. Some embodiments of the disclosure provide the following two methods for the adjustment.

Method I: for the coordinate points on each sampling line, a nozzle extrusion thickness corresponding to the coordinate points is correspondingly modified according to a z-axis coordinate of the outer contour point by the following equation. It should be noted that this method merely modifies the extrusion thickness, and the extrusion line width remains unchanged.

Extrusion Material Volume Per Unit Distance=Extrusion Thickness×Extrusion Line Width×Unit Distance Method II: with respect to the top layer, the extrusion thickness of corresponding points on the former layers of the top layer is modified. However, when the top layer is printed, the layer thickness of the extrusion line of the top layer remains unchanged. In other words, the nozzle extrusion thickness of corresponding coordinate points on several intermediate layers adjacent to the top layer is modified.

Figure 7:
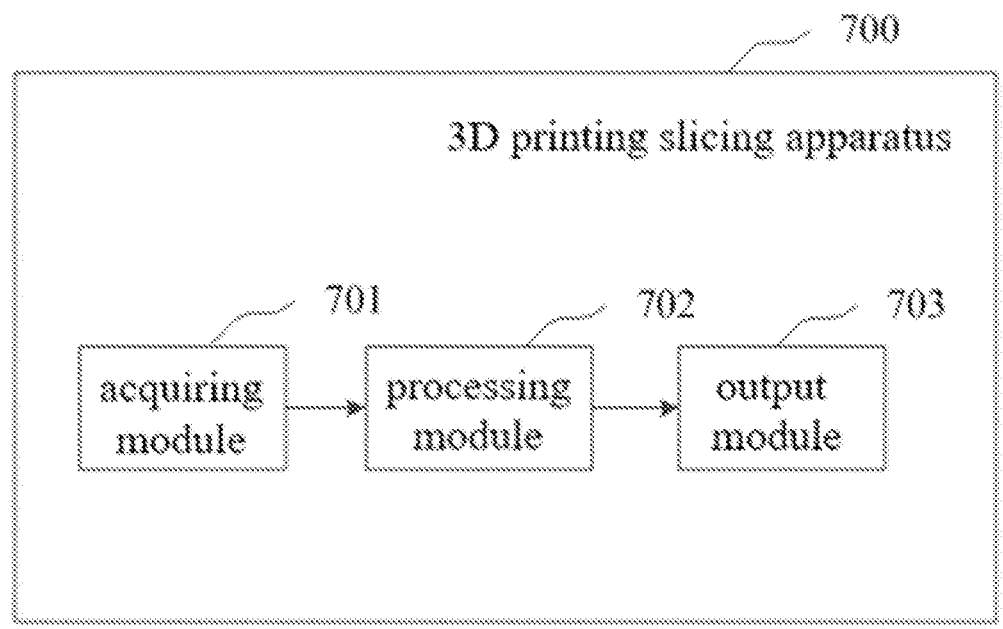
FIG. 7 is a schematic diagram illustrating a structure of a 3D printing slicing apparatus according to an embodiment of the disclosure.

In some embodiments, the disclosure provide a 3D printing slicing apparatus. FIG. 7 is a schematic diagram illustrating a structure of a 3D printing slicing apparatus. The 3D printing slicing apparatus 700 may include an acquiring module 701, a processing module 702, and an output module 703.

The acquiring module 701 may be configured to acquire a 3D model and a target texture picture. The target texture picture may be an outer contour texture picture of an object obtained by printing the 3D model.

The processing module 702 may be configured to perform the following steps. Obtaining a first model by preprocessing the 3D model and obtaining a first picture by preprocessing the target texture picture. Establishing a mapping set between the first model and the first picture, so that every coordinate point in the first model has a corresponding mapping point in the first picture. Slicing a target layer of the first model by a slice plane to obtain at least one intersection point between the target layer and the slice plane. Looking up at least one mapping point corresponding to the at least one intersection point in the first picture according to the mapping set, and obtaining corresponding outer contour points by revising coordinates of the at least one intersection point according to a difference between a pixel value of the at least one mapping point and a preset pixel threshold value.

The output module 703 may be configured to obtain an outer contour boundary line of the target layer by connecting the outer contour points successively.

In some embodiments, the processing module 702 may be configured to obtain the first model by dividing every outside surface of the 3D model into a plurality of triangular planes by a triangulation algorithm, respectively.

The mapping set may include a first mapping set and a second mapping set, every coordinate point in the first model may include a vertex coordinate point of a triangular plane in the plurality of triangular planes and a non-vertex coordinate point of the triangular plane, the first mapping set may include a mapping relationship between the vertex coordinate point and the corresponding mapping point of the vertex coordinate point in the first picture, and the second mapping set may include a mapping relationship between the non-vertex coordinate point and the corresponding mapping point of the non-vertex coordinate point in the first picture.

The processing module 702 may be configured to perform the following steps. If there is a plurality of intersection points, looking up the at least one mapping point corresponding to the plurality of intersection points respectively in the first picture according to the second mapping set. If there is one intersection point, looking up the at least one mapping point corresponding to the intersection point in the first picture according to the first mapping set.

The processing module 702 may be further configured to convert RGB color values of each pixel point in the target texture picture into corresponding gray value to obtain the first picture.

In some embodiments, the target layer may an intermediate layer of the first model, and the processing module 702 may be configured to perform the following steps. If the gray value of the mapping point is greater than the preset pixel threshold value, obtaining corresponding outer contour points by moving the intersection point corresponding to the mapping point horizontally outward by a first distance. The first distance may be calculated by subtracting the preset pixel threshold value from the gray value of the mapping point. If the gray value of the mapping point is smaller than the preset pixel threshold value, obtaining corresponding outer contour points by moving the intersection point corresponding to the mapping point horizontally inward by a second distance. The second distance may be calculated by subtracting the gray value of the mapping point from the preset pixel threshold value.

In some embodiments, the target layer may be a top layer of the first model, and the processing module 702 may be configured to perform the following steps. If the gray value of the mapping point is greater than the preset pixel threshold value, obtaining corresponding outer contour points by moving the intersection point corresponding to the mapping point vertically upward by a first distance. The first distance may be calculated by subtracting the preset pixel threshold value from the gray value of the mapping point. If the gray value of the mapping point is smaller than the preset pixel threshold value, obtaining corresponding outer contour points by moving the intersection point corresponding to the mapping point vertically downward by a second distance. The second distance is calculated by subtracting the gray value of the mapping point from the preset pixel threshold value.

Various processes to implement functions of each module in the apparatus of the embodiment of the disclosure may refer to description of the 3D printing slicing method in any corresponding embodiment in FIGS. 1 to 6.

In some embodiments, the disclosure may provide a 3D printing slicing electronic device, which may integrate any one of the 3D printing slicing apparatuses provided in the embodiments of the disclosure. The electronic device may include one or more processors, a memory, and one or more applications. The one or more applications may be stored in the memory and configured to execute, by the one or more processors, steps in the 3D printing slicing method in any one of embodiments of the above-mentioned 3D printing slicing method.

Figure 8:
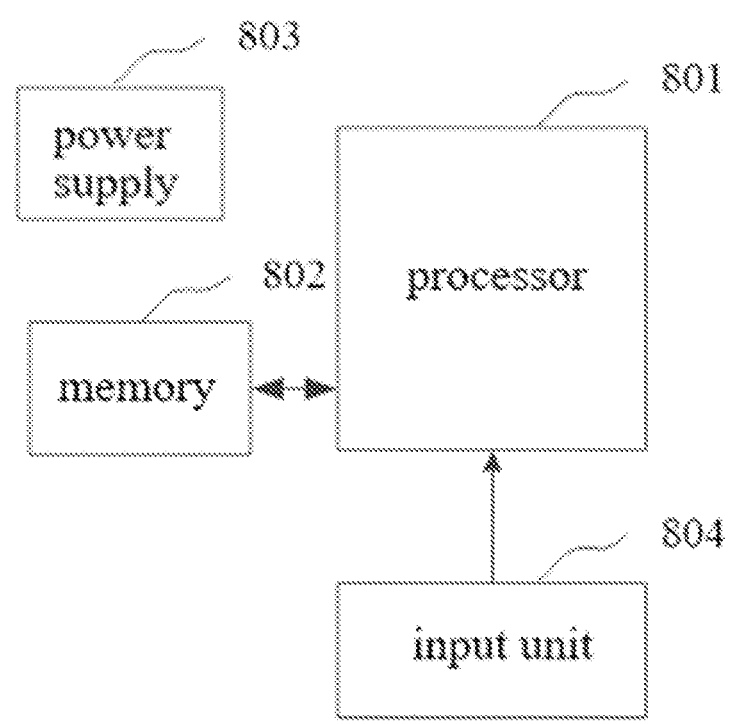
FIG. 8 is a schematic diagram illustrating a structure of a 3D printing slicing electronic device according to an embodiment of the disclosure.

The 3D printing slicing electronic device of the embodiment of the disclosure may integrate any one of the 3D printing slicing apparatuses provided in the embodiments of the disclosure. FIG. 8 is a schematic diagram illustrating a structure of a 3D printing slicing electronic device according to an embodiment of the disclosure. The electronic device may include components such as a processor 801 of one or more processing cores, a memory 802 of one or more computer-readable storage media, a power supply 803, an input unit 804, and the like. It is to be noted that those skilled in the art would understand that the structure of the electronic device shown in FIG. 8 does not constitute definition to the electronic device, and may include more or fewer components than those shown, or combine some components, or have different component arrangements.

The processor 801 is a control center of the electronic device, which uses various interfaces and lines to connect each part of the whole electronic device, executes various functions of the electronic device and processes data by running or executing software programs and/or modules stored in the memory 802 and calling data stored in the memory 802, thereby monitoring the electronic device as a whole. Alternatively, the processor 801 may include one or more processing cores. The processor 801 may be a central processing unit (CPU), and may also be other general-purpose processors, digital signal processors (DSP), application specific integrated circuits (ASIC), field-programmable gate array (FPGA) or other programmable logic devices, discrete gates or transistor logic devices, discrete hardware components, et cetera. The general-purpose processor may be a microprocessor, or the processor may be any conventional processor, et cetera. Optionally, the processor 801 may integrate an application processor and a modem processor. The application processor mainly processes an operating system, a user interface, applications, etc., and the modem processor mainly processes wireless communication. It may be understood that the above modem processor may not be integrated into the processor 801.

The memory 802 may be used to store software programs and modules, and the processor 801 may execute various functional applications and data processing by running the software programs and the modules stored in the memory 802. The memory 802 may mainly include a storage program area and a storage data area. The storage program area may store the operating system, applications required by at least one function (such as sound playing function, image playing function, etc.). The storage data area may store data created according to use of the server, et cetera. In addition, the memory 802 may include a high-speed random-access memory, and may also include a non-volatile memory, such as at least one disk storage device, a flash memory device, or other volatile solid-state memory devices. Correspondingly, the memory 802 may also include a memory controller to provide an access to the memory 802 by the processor 801.

The electronic device further may include a power supply 803 which supplies power to each component. Optionally, the power supply 803 may be logically connected to the processor 801 by a power supply management system, so that the functions such as charging, discharging, power-consumption managing or the like may be implemented by the power supply management system. The power supply 803 may further include arbitrary components such as one or more DC or AC power supply, a recharging system, a power supply failure detecting circuit, a power supply converter or inverter, a power supply status indicator, etc.

The electronic device may further include an input unit 804 which may be used to receive information on the input digital or character, and generate a keyboard, a mouse, a joystick and an optical or trackball signal input related to user setting and function control.

Although not illustrated, the server may further include a display unit and the like. Specifically, the processor 801 in the electronic device may load the executable file corresponding to a progress of one or more applications into the memory 802 according to the following instructions, and the processor 801 may run the applications stored in the memory 802, to implement following steps.

Acquiring a 3D model and a target texture picture. The target texture picture is an outer contour texture picture of an object obtained by printing the 3D model.

Obtaining a first model by preprocessing the 3D model and obtaining a first picture by preprocessing the target texture picture.

Establishing a mapping set between the first model and the first picture, so that every coordinate point in the first model has a corresponding mapping point in the first picture.

Slicing a target layer of the first model by a slice plane to obtain at least one intersection point between the target layer and the slice plane.

Looking up the at least one mapping point corresponding to at least one intersection point in the first picture according to the mapping set, and obtaining corresponding outer contour points by revising coordinates of the at least one intersection point according to a difference between a pixel value of the at least one mapping point and a preset pixel threshold value.

Obtaining an outer contour boundary line of the target layer by connecting the outer contour points successively.

Those skilled in the art would understand that, for the convenience and conciseness of the description, the specific working process of the 3D printing slicing apparatus, the electronic device, and the corresponding units thereof described above may refer to the description of the 3D printing slicing method in any corresponding embodiment in FIGS. 1 to 6.

Those skilled in the art would understand that all or part of steps in various methods of the above embodiments may be completed by instructions or by controlling related hardware with instructions. The instructions may be stored in a computer-readable storage medium and loaded and executed by the processor 801.

In some embodiments, disclosure provides a computer-readable storage medium, which may include: a read only memory (ROM), a random-access memory (RAM), a disk, an optical disk, et cetera. A computer program is stored on the computer-readable storage medium. The computer program is loaded by the processor to execute steps in any one of the 3D printing slicing methods provided in the embodiments of the disclosure. For example, the computer program is loaded by the processor to execute the following steps.

Acquiring a 3D model and a target texture picture. The target texture picture is an outer contour texture picture of an object obtained by printing the 3D model.

Obtaining a first model by preprocessing the 3D model and obtaining a first picture by preprocessing the target texture picture.

Establishing a mapping set between the first model and the first picture, so that every coordinate point in the first model has a corresponding mapping point in the first picture.

Slicing a target layer of the first model by a slice plane to obtain at least one intersection point between the target layer and the slice plane.

Looking up the at least one mapping point corresponding to at least one intersection point in the first picture according to the mapping set, and obtaining corresponding outer contour points by revising coordinates of the at least one intersection point according to a difference between a pixel value of the at least one mapping point and a preset pixel threshold value.

Obtaining an outer contour boundary line of the target layer by connecting the outer contour points successively.

Various embodiment of the disclosure may have one or more of the following effects. In some embodiments, the disclosure may provide 3D printing slicing methods, apparatuses, devices, and storage mediums, which may help to solve the problems that when the lamination effect of 3D printing is solved by a method of establishing surface texture features in the related technique, the scope of application is limited and it is difficult to be completed by non-professionals. In other embodiments, surface textures of the model may be edited by loading a two-dimensional picture into a model surface, such that different effects of directly simulating various textures or various materials by a software method may be implemented, and the scope of application may be widen, which may help to solve the technical problems that when the lamination effect of 3D printing is solved by a method of establishing surface texture features in the related technique, the scope of application is limited and it is difficult to be completed by non-professionals.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The invention claimed is:

1. A 3D printing slicing method, comprising the steps of:
   (1) acquiring a 3D model and a target texture picture, the target texture picture being an outer contour texture picture of an object obtained by printing the 3D model;
   (2) obtaining a first model by preprocessing the 3D model and obtaining a first picture by preprocessing the target texture picture;
   (3) establishing a mapping set between the first model and the first picture, so that every coordinate point in the first model has a corresponding mapping point in the first picture;
   (4) slicing a target layer of the first model by a slice plane to obtain at least one intersection point between the target layer and the slice plane;
   (5) looking up at least one mapping point corresponding to the at least one intersection point in the first picture according to the mapping set, and obtaining corresponding outer contour points by revising coordinates of the at least one intersection point according to a difference between a pixel value of the at least one mapping point and a preset pixel threshold value; and
   (6) obtaining an outer contour boundary line of the target layer by connecting the outer contour points successively;

wherein:
   obtaining the first picture in step (2) comprises converting RGB color values of each pixel point in the target texture picture into corresponding gray values;
   the target layer in step (4) is an intermediate layer of the first model; and
   obtaining corresponding outer contour points in step (5) comprises:
   upon determining that a gray value of the at least one mapping point is greater than the preset pixel threshold value, moving the at least one intersection point horizontally outward by a first distance, the first distance being calculated by subtracting the preset pixel threshold value from the gray value of the at least one mapping point; and
   upon determining that the gray value of the at least one mapping point is smaller than the preset pixel threshold value, moving the at least one intersection point horizontally inward by a second distance, the second distance being calculated by subtracting the gray value of the mapping point from the preset pixel threshold value.

2. The method of claim 1, wherein obtaining the first model in step (2) comprises dividing each outside surface of the 3D model into a plurality of triangular planes by a triangulation algorithm, respectively.

3. The method of claim 2, wherein:
   the mapping set includes a first mapping set and a second mapping set;
   every coordinate point in the first model includes a vertex coordinate point of a triangular plane in the plurality of triangular planes and a non-vertex coordinate point of the triangular plane;
   the first mapping set includes a mapping relationship between the vertex coordinate point and the corresponding mapping point of the vertex coordinate point in the first picture; and
   the second mapping set includes a mapping relationship between the non-vertex coordinate point and the corresponding mapping point of the non-vertex coordinate point in the first picture.

4. The method of claim 3, wherein looking up at least one mapping point in step (5) comprises:
   upon determining that there is a plurality of intersection points, looking up the at least one mapping point corresponding to the plurality of intersection points respectively in the first picture according to the second mapping set; and
   upon determining that there is one intersection point, looking up the at least one mapping point corresponding to the intersection point in the first picture according to the first mapping set.

5. A 3D printing slicing device, comprising:
   one or more processor;
   a memory; and
   an application stored in the memory and configured to be executed by the one or more processor to implement the 3D printing slicing method of claim 1.

6. A non-transitory computer-readable medium including one or more sequences of instructions that, when executed by one or more processors, cause the one or more processors to execute steps (1)-(6) of claim 1.

7. A 3D printing slicing apparatus, comprising:
an acquiring module configured to acquire a 3D model and a target texture picture, the target texture picture being an outer contour texture picture of an object obtained by printing the 3D model;
a processing module configured to:
obtain a first model by preprocessing the 3D model and obtain a first picture by preprocessing the target texture picture;
establish a mapping set between the first model and the first picture, so that every coordinate point in the first model has a corresponding mapping point in the first picture;
slice a target layer of the first model by a slice plane to obtain at least one intersection point between the target layer and the slice plane; and
look up at least one mapping point corresponding to the at least one intersection point in the first picture according to the mapping set, and obtain corresponding outer contour points by revising coordinates of the at least one intersection point according to a difference between a pixel value of the at least one mapping point and a preset pixel threshold value; and
an output module configured to obtain an outer contour boundary line of the target layer by connecting the outer contour points successively:
wherein:
obtaining the first picture comprises converting RGB color values of each pixel point in the target texture picture into corresponding gray values;
the target layer is an intermediate layer of the first model; and
obtaining corresponding outer contour points comprises:
upon determining that a gray value of the at least one mapping point is greater than the preset pixel threshold value, moving the at least one intersection point horizontally outward by a first distance, the first distance being calculated by subtracting the preset pixel threshold value from the gray value of the at least one mapping point; and
upon determining that the gray value of the at least one mapping point is smaller than the preset pixel threshold value, moving the at least one intersection point horizontally inward by a second distance, the second distance being calculated by subtracting the gray value of the mapping point from the preset pixel threshold value.

8. A 3D printing slicing method, comprising the steps of:
(1) acquiring a 3D model and a target texture picture, the target texture picture being an outer contour texture picture of an object obtained by printing the 3D model;
(2) obtaining a first model by preprocessing the 3D model and obtaining a first picture by preprocessing the target texture picture;
(3) establishing a mapping set between the first model and the first picture, so that every coordinate point in the first model has a corresponding mapping point in the first picture;
(4) slicing a target layer of the first model by a slice plane to obtain at least one intersection point between the target layer and the slice plane;
(5) looking up at least one mapping point corresponding to the at least one intersection point in the first picture according to the mapping set, and obtaining corresponding outer contour points by revising coordinates of the at least one intersection point according to a difference between a pixel value of the at least one mapping point and a preset pixel threshold value; and
(6) obtaining an outer contour boundary line of the target layer by connecting the outer contour points successively;
wherein:
obtaining the first picture in step (2) comprises converting RGB color values of each pixel point in the target texture picture into corresponding gray values;
the target layer in step (4) is a top layer of the first model; and
obtaining corresponding outer contour points in step (5) comprises:
upon determining that a gray value of the at least one mapping point is greater than the preset pixel threshold value, moving the at least one intersection point vertically upward by a first distance, the first distance being calculated by subtracting the preset pixel threshold value from the gray value of the at least one mapping point; and
upon determining that the gray value of the at least one mapping point mapping point is smaller than the preset pixel threshold value, moving the at least one intersection point vertically downward by a second distance, the second distance being calculated by subtracting the gray value of the mapping point from the preset pixel threshold value.

9. The method of claim 8, wherein obtaining the first model in step (2) comprises dividing each outside surface of the 3D model into a plurality of triangular planes by a triangulation algorithm, respectively.

10. The method of claim 8, wherein:
the mapping set includes a first mapping set and a second mapping set;
every coordinate point in the first model includes a vertex coordinate point of a triangular plane in the plurality of triangular planes and a non-vertex coordinate point of the triangular plane;
the first mapping set includes a mapping relationship between the vertex coordinate point and the corresponding mapping point of the vertex coordinate point in the first picture; and
the second mapping set includes a mapping relationship between the non-vertex coordinate point and the corresponding mapping point of the non-vertex coordinate point in the first picture.

11. The method of claim 8, wherein looking up at least one mapping point in step (5) comprises:
upon determining that there is a plurality of intersection points, looking up the at least one mapping point corresponding to the plurality of intersection points respectively in the first picture according to the second mapping set; and
upon determining that there is one intersection point, looking up the at least one mapping point corresponding to the intersection point in the first picture according to the first mapping set.

12. A 3D printing slicing device, comprising:
one or more processor;
a memory; and
an application stored in the memory and configured to be executed by the one or more processor to implement the 3D printing slicing method of claim 8.

13. A non-transitory computer-readable medium including one or more sequences of instructions that, when executed by one or more processors, cause the one or more processors to execute steps (1)-(6) of claim 8.

14. A 3D printing slicing apparatus, comprising:
   an acquiring module configured to acquire a 3D model and a target texture picture, the target texture picture being an outer contour texture picture of an object obtained by printing the 3D model;
   a processing module configured to:
      obtain a first model by preprocessing the 3D model and obtain a first picture by preprocessing the target texture picture;
      establish a mapping set between the first model and the first picture, so that every coordinate point in the first model has a corresponding mapping point in the first picture;
      slice a target layer of the first model by a slice plane to obtain at least one intersection point between the target layer and the slice plane; and
      look up at least one mapping point corresponding to the at least one intersection point in the first picture according to the mapping set, and obtain corresponding outer contour points by revising coordinates of the at least one intersection point according to a difference between a pixel value of the at least one mapping point and a preset pixel threshold value; and
   an output module configured to obtain an outer contour boundary line of the target layer by connecting the outer contour points successively;
wherein:
   obtaining the first picture comprises converting RGB color values of each pixel point in the target texture picture into corresponding gray values;
   the target layer is a top layer of the first model; and
   obtaining corresponding outer contour points comprises:
      upon determining that a gray value of the at least one mapping point is greater than the preset pixel threshold value, moving the at least one intersection point vertically upward by a first distance, the first distance being calculated by subtracting the preset pixel threshold value from the gray value of the at least one mapping point; and
      upon determining that the gray value of the at least one mapping point mapping point is smaller than the preset pixel threshold value, moving the at least one intersection point vertically downward by a second distance, the second distance being calculated by subtracting the gray value of the mapping point from the preset pixel threshold value.

* * * * *